(12) United States Patent
Stöffler et al.

(10) Patent No.: US 9,144,116 B2
(45) Date of Patent: Sep. 22, 2015

(54) INDUCTION HEATING DEVICE AND INDUCTION HOB WITH INDUCTION HEATING DEVICES

(71) Applicant: E.G.O. Elektro-Gerätebau GmbH, Oberderdingen (DE)

(72) Inventors: Michael Stöffler, Maulbronn (DE); Sebastian Stadtmüller, Ubstadt (DE)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 323 days.

(21) Appl. No.: 13/624,219

(22) Filed: Sep. 21, 2012

(65) Prior Publication Data
US 2013/0112684 A1    May 9, 2013

(30) Foreign Application Priority Data

Sep. 21, 2011    (DE) .......................... 10 2011 083 125

(51) Int. Cl.
*H05B 6/12*    (2006.01)
*H05B 6/36*    (2006.01)

(52) U.S. Cl.
CPC .............. *H05B 6/362* (2013.01); *H05B 6/1245* (2013.01); *H05B 6/1254* (2013.01); *H05B 6/1272* (2013.01); *Y02B 40/126* (2013.01)

(58) Field of Classification Search
CPC .... H05B 6/362; H05B 6/1272; H05B 6/1281; H05B 6/1263; H05B 6/1245; H05B 2208/022; H05B 2208/024; H05B 6/065; H05B 6/12; H05B 6/1209; Y02B 40/126; Y02B 40/123
USPC ......... 219/675, 662, 676, 622, 620, 624, 671, 219/626, 670, 673, 460.1, 462.1, 465.1, 219/468.1, 630, 665, 672, 600, 621; 99/DIG. 14; 336/205, 232
See application file for complete search history.

(56) References Cited

U.S. PATENT DOCUMENTS

| | | | |
|---|---|---|---|
| 3,906,181 A | * | 9/1975 | Hibino et al. ................. 219/622 |
| 5,866,884 A | * | 2/1999 | Cornec et al. ................ 219/622 |
| 8,003,924 B2 | | 8/2011 | Kim et al. |

(Continued)

FOREIGN PATENT DOCUMENTS

| | | |
|---|---|---|
| CH | 592 997 A5 | 2/1974 |
| CN | 101204290 | 6/2008 |

(Continued)

OTHER PUBLICATIONS

German Office Action dated May 21, 2012 in DE 10 2011 083 125.8.

(Continued)

*Primary Examiner* — Hung D Nguyen
(74) *Attorney, Agent, or Firm* — Lee & Hayes, PLLC

(57) ABSTRACT

In an induction heating device having an induction coil for an induction hob, the induction coil may be of flat or planar design and have at least one peripheral coil turn comprising coil wire. The outer contour of the induction coil or the outermost coil turn may be approximately trapezoidal having two sides of equal length which are situated opposite one another and may be straight, and having two short sides of differing length between the sides of equal length.

20 Claims, 5 Drawing Sheets

(56) References Cited

U.S. PATENT DOCUMENTS

| | | |
|---|---|---|
| 2009/0212042 A1 * | 8/2009 | Lee et al. ............... 219/624 |
| 2010/0176116 A1 * | 7/2010 | Lee et al. ............... 219/460.1 |
| 2012/0248095 A1 | 10/2012 | Lee et al. |
| 2012/0248098 A1 | 10/2012 | Lee et al. |

FOREIGN PATENT DOCUMENTS

| | | |
|---|---|---|
| DE | 917 204 B | 8/1954 |
| DE | 195 38 719 A1 | 4/1997 |
| DE | 199 55 457 A1 | 5/2001 |
| DE | 20 2006 016 551 U1 | 4/2008 |
| EP | 0619693 B1 * | 5/1998 |
| JP | H1054565 | 2/1998 |
| WO | WO 2008058614 A1 * | 5/2008 |

OTHER PUBLICATIONS

European Search Report dated Sep. 18, 2013 in EP 12 18 46 98.

Chinese OA dated Jun. 2, 2015 from Patent Application No. 201210448631.0, entitled, "Induction Heating Device and Induction HOB Having a Plurality of Induction Heating Devices of this Kind", 11 pages.

* cited by examiner

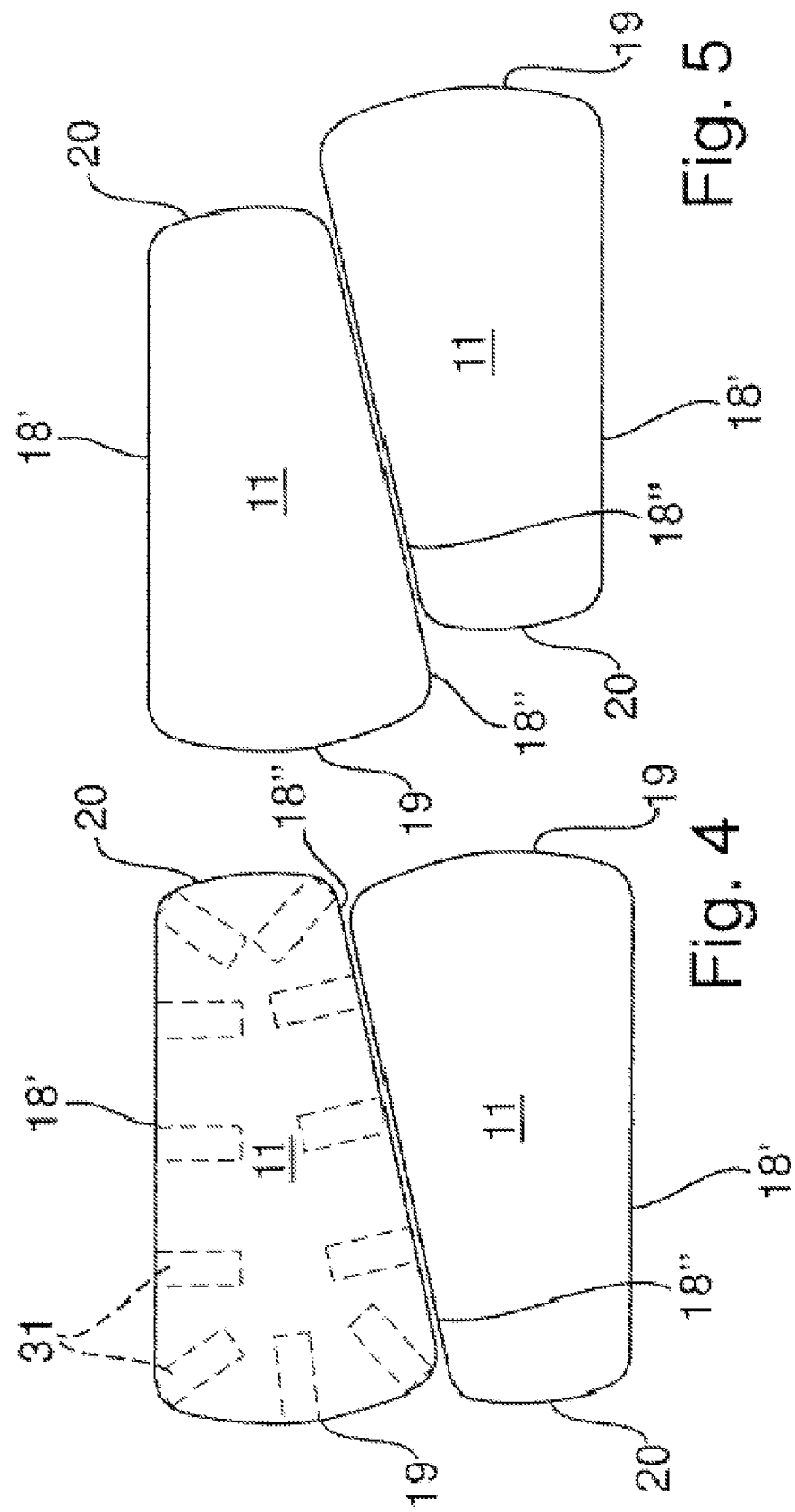

INDUCTION HEATING DEVICE AND INDUCTION HOB WITH INDUCTION HEATING DEVICES

CROSS REFERENCE TO RELATED APPLICATIONS

This application claims the benefit of German patent application DE 10 2011 083 125.8, filed on Sep. 21, 2011, the contents of which are incorporated by reference for all that it teaches.

FIELD

The invention relates to an induction heating device and to an induction hob having induction heating devices.

BACKGROUND

DE 202006016551 U1 discloses arranging a plurality of induction coils adjacent to one another. Therefore, said induction coils can form a cooking point or induction-heated cooking area which can be increased in size in a variable manner.

SUMMARY

The disclosure herein provides an induction heating device and induction hob that avoids problems of the prior art and, in particular, better usability can be achieved when a plurality of such induction heating devices are arranged next to one another.

This object is achieved by an induction heating device having the features described herein. Advantageous and preferred refinements of the disclosure are the subject matter of the further claims and will be explained in greater detail in the text which follows. In doing so, some of the following features will be described only for the induction heating device or only for the induction hob. However, irrespective of this, said features are intended to be applicable both to an induction heating device and to an induction hob. The wording of the claims is included in the content of the description by express reference.

According to various embodiments an induction heating device may have an induction coil which is flat or runs in one plane. The induction coil may have at least one peripheral coil turn comprising coil wire. The outer contour of the induction coil or the outermost coil turn may have an approximate trapezoidal shape. The said trapezoidal shape may have two sides situated opposite one another being of approximately equal length, and have two short sides therebetween, which are of differing length however, of the trapezoidal shape. The long sides may be substantially straight. According to various embodiments, the short sides may be curved slightly outwards, at least the shorter short side. In the case of an induction hob according to the various embodiments, at least two of the abovementioned induction coils may be provided and in this case may be close together or adjoin one another in such a way that the short sides which are each of different lengths are situated opposite one another.

These and further features can be gathered not only from the claims but also from the description and the drawings, wherein the individual features can be realized in each case by themselves or in combination in the form of subcombinations in an embodiment of the disclosure and in other fields and can constitute advantageous and inherently patentable embodiments for which protection is claimed here. The subdivision of the application into individual sections and subheadings does not restrict the general validity of the statements made thereunder.

BRIEF DESCRIPTION OF THE DRAWINGS

Exemplary embodiments of the disclosure are schematically illustrated in the drawings and will be explained in greater detail in the text which follows. In the drawings:

FIGS. 4 and 5 show possible arrangements of two induction coils; and

DETAILED DESCRIPTION

Figure 1:
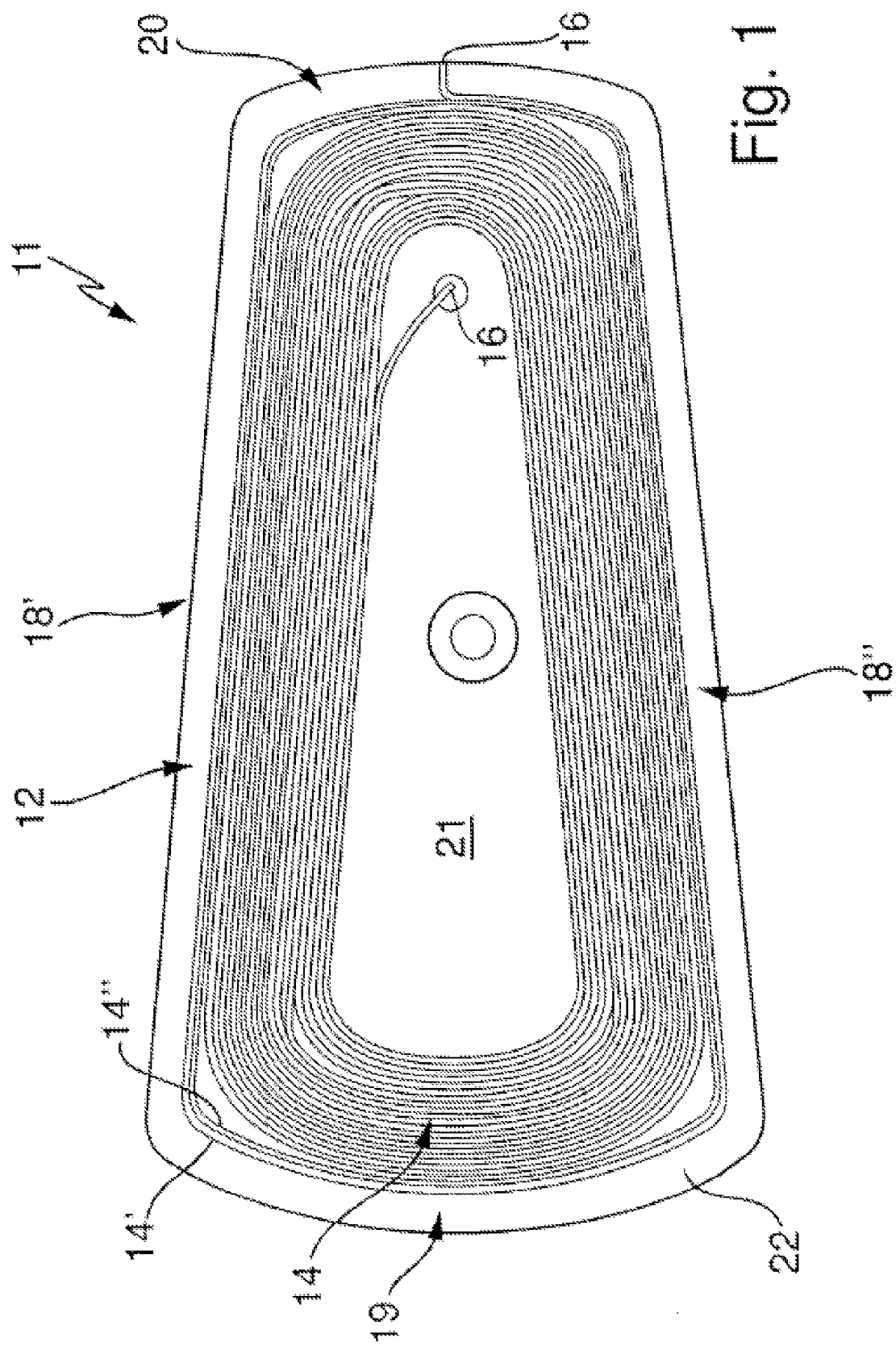
FIG. 1 shows a plan view of an induction heating device according to various embodiments with an induction coil of approximately trapezoidal shape.

As discussed briefly above and as will be discussed in greater detail below, provision may be made herein for an induction heating device to have an induction coil which is flat or runs in one plane. The induction coil may have at least one peripheral coil turn comprising coil wire, advantageously a plurality of, for example 5 to 25, coil turns. The induction coil is particularly preferably composed of a continuous coil wire, that is to say without intermediate taps or the like.

According to various embodiments, the outer contour of the induction coil or the outermost coil turn, advantageously more than just the outermost coil turn, may have an approximate trapezoidal shape. The said trapezoidal shape may have two sides which are situated opposite one another and are of approximately equal length, and has two short sides therebetween, which are of differing length however, of the trapezoidal shape. The long sides may be advantageously substantially straight. The short sides may be advantageously curved slightly outwards, at least the shorter short side.

On account of this trapezoidal shape of the induction coil and therefore of the substantial portion of the induction heating device, it is possible to create differently shaped inductively heated areas or cooking points with a single type of induction coil or induction heating device, which has an induction coil of this kind as a modular unit, by means of arranging said induction coils on one another or next to one another.

In the case of the said rectangular induction coils known from the prior art, the degree of variability is lower, or greater variability can be achieved with induction coils which are relatively small in comparison to a pot, itself a small pot. Advantageous examples will be cited and explained further below as refinements of the disclosure for differently shaped inductively heated areas or cooking points.

In an advantageous refinement of the disclosure, the induction coil may be designed essentially with mirror-image symmetry with respect to a mirror axis which runs between the two long sides of the induction coil. Mirror-image symmetry of this kind is considered to be advantageous in respect of simpler production of the induction coil and a profile of the coil turns which is as uniform as possible and build-up of the magnetic field of the induction coil during operation.

In a further refinement of the disclosure, at least one, preferably two, coil turns may have an angular profile in the region of the corners of the trapezoidal shape, this or these preferably being the outermost coil turn or turns. In this case, the concept of the angular profile is to be seen against the background of and the options for the used coil wire, so that the said corners can still have an extremely small radius. However, this may not exceed one to three times the diameter of the wire. Coil turns which are situated further inwards can then have a more rounded profile in the corner regions, this being advantageous for the winding process.

In a refinement of the disclosure, the induction coil may be approximately 1.5 times to 2.5 times as long as the longer short side. Therefore, the elongate trapezoidal shape can still be substantially approximately rectangular.

In a yet further advantageous refinement of the disclosure, the induction coil, at that end with the longer short side, may be approximately 1.3 times to 2.5 times as wide as at that opposite end with the shorter short side. Therefore, the trapezoidal shape is somewhat pronounced but, at the same time, the difference in width is not so large that meaningful options in terms of construction would be made more difficult. Furthermore, the angles in the corner regions and the profile of the outer coil turns at the narrow end are thus still somewhat expedient for the purpose of winding the coil wire. In respect of the absolute size proportions, the width of the induction coil in the end region with the longer short side can be approximately 100 mm to 200 mm, advantageously approximately 120 mm to 160 mm. In the other end region, it may be 80 mm to 160 mm, advantageously approximately 90 mm to 120 mm. The length of the induction coil can be 240 mm to 320 mm, advantageously approximately 250 mm to 300 mm.

In a further development of the disclosure, a central region of the induction coil may be free of coil turns. Firstly, this is generally advantageous in induction coils on account of the formation of the magnetic field including the input of energy into a pot base which is situated above the said induction coils. Secondly, problems in respect of temperature can be reduced and also the profile of the coil wire or the coil turns can be optimized, these otherwise being adversely affected on account of the elongate shape of the magnetic field. This free central region can amount to approximately one fifth to one third of the surface area of the induction coil and have a width of at least a few centimeters.

In a further refinement of the disclosure, ferrites in the form of a flat and long rod can be arranged on the induction coil or beneath the induction coil. Ferrites of this kind are known, in principle, from induction coils, in particular for induction heating devices in hobs. It has been found to be highly advantageous if such ferrites are at least also arranged at each one of the corners of the trapezoidal shape, the said ferrites projecting beyond all the coil turns in this region but leaving free a central region similar to the abovementioned central region. In this case, the longitudinal extent of the ferrites is transverse to the direction of the coil turns. A further ferrite can be provided along the short sides between the ferrites which are arranged at the corners, advantageously a plurality of ferrites being provided along the long sides.

The coil wire used can be a coil wire for induction coils which is known in principle, advantageously comprising a plurality of braids. The distance between the individual coil turns with respect to one another can predominantly be very small, but under certain circumstances can also be somewhat larger in regions.

In the case of an induction hob according to the disclosure, at least two of the abovementioned induction coils may be provided and in this case are close together or adjoin one another in such a way that the short sides which are each of different lengths are situated opposite one another. This therefore means that in each case a relatively large and a relatively small end region of the two induction coils bear against one another. In this case, the induction coils may have the same shape, that is the same trapezoidal shape, and are, in particular, identical. Therefore, a rectangular shape or an approximately rectangular shape can be created by arranging said induction coils. Advantageously, even yet more such identical induction coils as induction heating devices may be provided next to one another on the induction hob, for example three to seven such induction coils. As a result, it is again possible to depart from the above-described approximately rectangular shape to some extent, this not causing any problems and, on the contrary, possibly being advantageous. At the same time, this can create a highly variable inductively heatable surface area if, primarily, the induction coils can each be controlled individually but are also designed for combined operation.

Firstly, it is possible, in the case of a first refinement of the disclosure, for corners of the induction coils to each be situated virtually in a straight line approximately in the direction of the short sides. This means that the corners are situated virtually directly next to one another and the short sides run approximately along one line, that is a straight line. Furthermore, the in each case adjacent long sides are then situated approximately next to one another over their entire length. A rectangular shape or a parallelogram can substantially be achieved for the inductively heatable surface area as a result. Two such induction coils may be advantageously used in this case and when three such induction coils are used in this arrangement, a trapezoidal shape is again produced overall.

A second refinement of the disclosure proceeds, as it were, from the above-described first refinement, wherein in this case the induction coils may be somewhat displaced in relation to one another again and, in the process, the relatively long short sides are further away from one another. Although firstly a departure may be made from, or there is an interruption in, the abovementioned rather closed rectangular surface area, this displacement advantageously amounts to only a few centimeters or 5% to 15% or at most 20% of the length of an induction coil, and therefore the interruption in the abovementioned shape firstly is not so great and a rather coherent surface area is maintained. Secondly, it is then very easy to heat both one very large pot by the entire heated surface area and also a plurality of smaller pots individually and independently of one another, it being possible to arrange each of the said smaller pots specifically over the relatively wide end region of the induction coils. Although this is also possible with combined induction cooking points which arrange two substantially circular induction coils close to one another, joint operation of said induction cooking points may result in only elongate pots or pans, and not large round pots, being heated in a somewhat uniform manner on account of the necessarily resulting relatively elongate overall surface area.

Referring now to the drawings, FIG. 1 shows a plan view of an induction heating device 11. Said induction heating device has an induction coil 12 with a large number of coil turns, in this case 21 coil turns 14. As can be seen, the outermost coil turn 14' together with the second outermost coil turn 14" has an approximately trapezoidal shape. The said trapezoidal shape gives the induction coil 12 its outer shape with two long sides 18' and 18", which are of equal length, and with a long short side 19 on the left and a short side 20 on the right. Furthermore, the induction coil 12 has two connections 16, one arriving from the right at the short side 20 to the right-hand side and one in a central region 21 at the bottom through a support 22 on which the induction coil 12 is arranged, in particular firmly bonded, in a conventional manner. Furthermore, FIG. 1 shows that the support 22 projects by a uniform distance beyond the trapezoidal shape or the profile of the outermost coil turn 14'.

The coil wire used for the induction coil 12 may be a 90×0.2 mm braided copper wire. The support 22 can be composed of mica with a thickness of approximately 0.4 mm.

While the long sides 18' and 18" are substantially straight, the short sides 19 and 20 are curved outwards to a certain extent. This is based less on the type of winding of the outer coil turns 14' and 14" but rather on that of those which are situated further inwards. The corners of the two outermost coil windings 14' and 14" between the respective sides are, as has been explained above, relatively pointed or angled. In this case, they are also at a small distance or have a small intermediate spacing from the coil turns 14 which are situated further inwards since these are less angular on account of the simplified winding. The outer trapezoidal shape is also found again substantially in the central region 21 except for the more rounded corners and, because this central region 21 is relative narrow, the left-hand short side is only a broadly rounded portion.

The length of the induction coil 12 can be approximately 25 cm and accordingly the length of the left-hand long short side 19 can be approximately 13 cm and that of the right-hand short side 20 can be approximately 9 cm. The central region 21 can then have a height of at least 2 cm on side 19. The rated power of the induction coil can be 1.4 kW and its brief boost power can be 2.1 kW.

Figure 2:
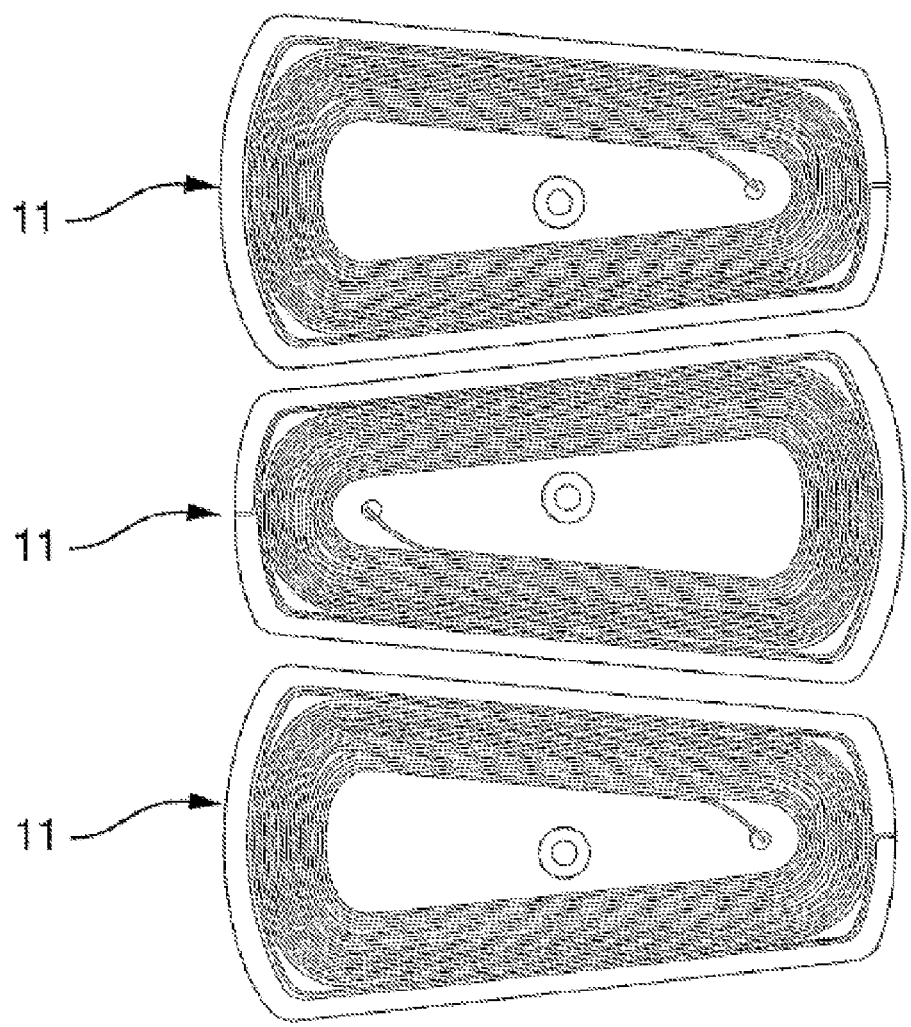
FIG. 2 shows a plan view of an arrangement of three induction coils according to FIG. 1 next to one another.

FIG. 2 shows a plan view of an arrangement of three identical induction coils 11 which are each situated one against the other by way of their long sides 18' and 18" in a manner rotated through 180° in relation to one another and the supports 22 are situated parallel to one another and next to one another with a distance of 1 cm to 2 cm between them, so that the outermost coil turns in each case also run parallel to on another. Therefore, a so-called inductively heated surface zone can be formed. It is therefore possible to heat either large so-called roasting tins, as explained in the introductory part, or small pots, as will be explained below.

Figure 6:
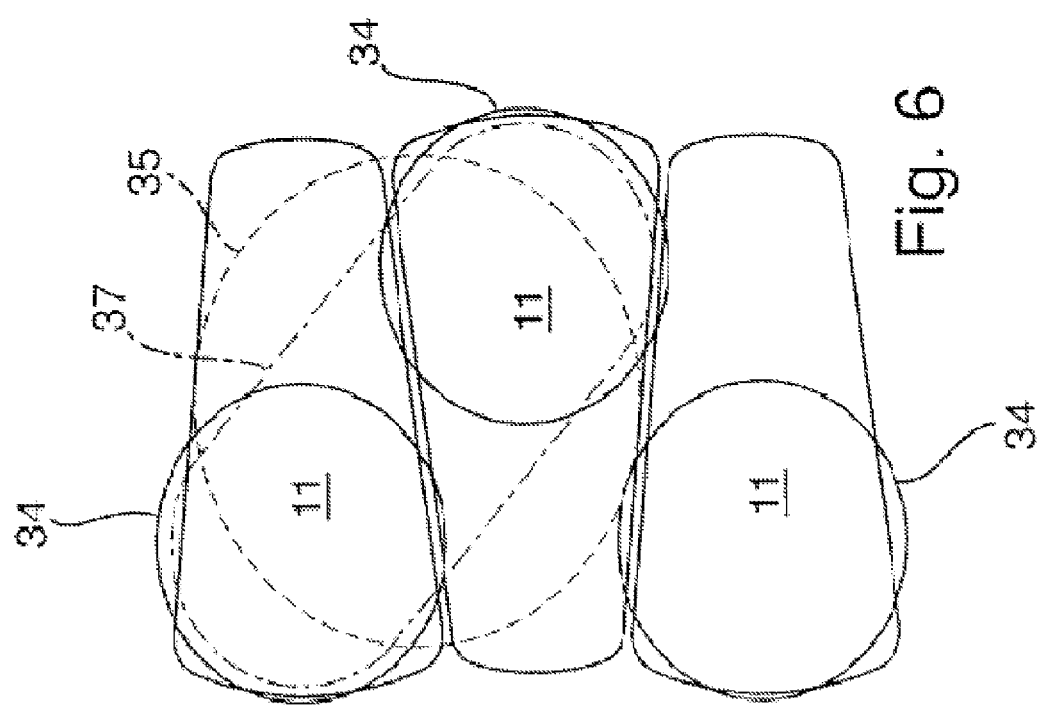

This arrangement of FIG. 2, which otherwise also corresponds, in principle, to that of FIG. 6, is designed such that the respective short sides of all three induction coils 11 are situated in a line or are not offset in relation to one another. As an alternative, it is possible, in general, for a plurality of induction coils to be arranged next to one another virtually in the same direction with the long short sides adjoining one another, that is to say a kind of partial circle or even a semicircle can be produced. Other examples will be explained in greater detail in the text which follows.

Figure 3:
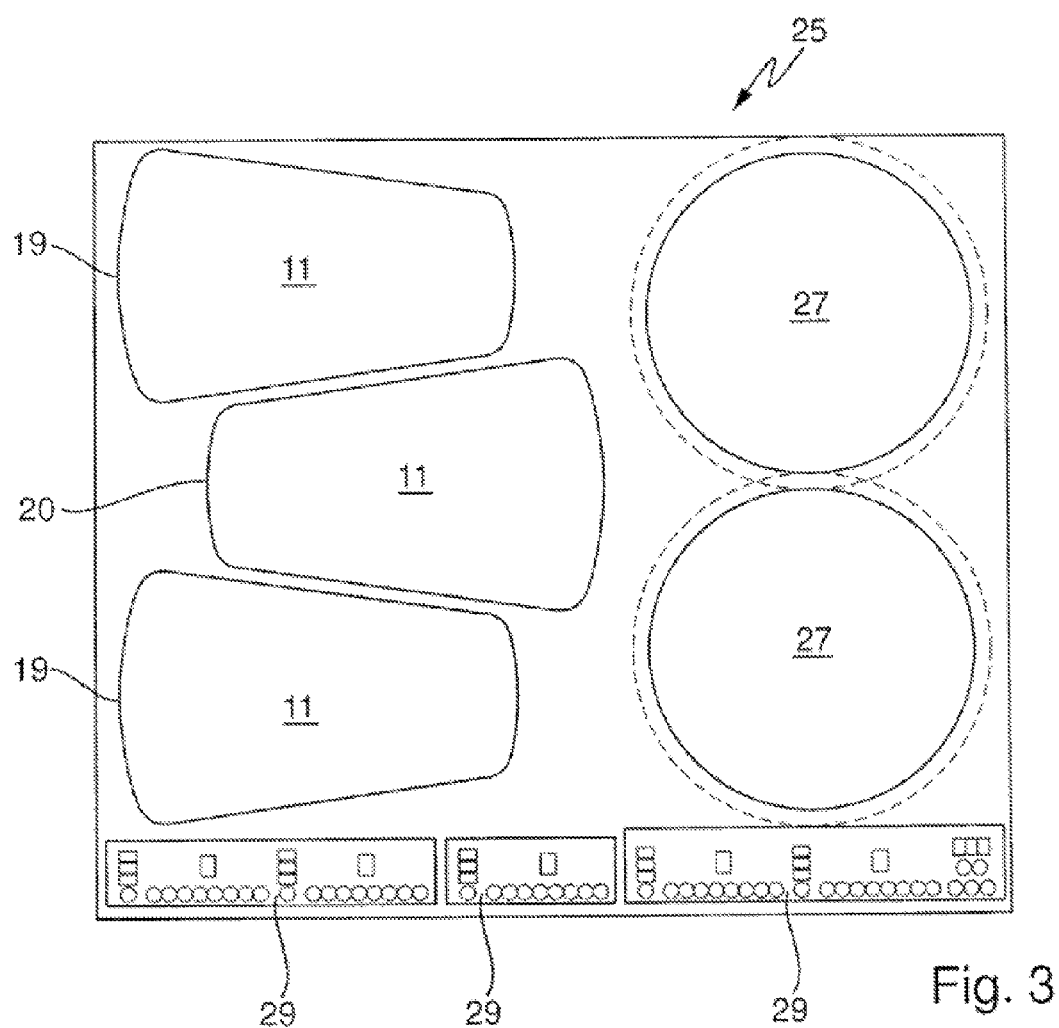
FIG. 3 shows a view of an induction hob according to the embodiments from above with three induction coils according to FIG. 2.

FIG. 3 shows an induction hob 25 according to the disclosure with three induction heating devices 11 according to FIG. 1 in the left-hand region and two round induction heating devices 27 in the right-hand region. Controllers 29 with operator control elements for actuating the respective induction heating devices 11 and 27 are arranged beneath each of the said induction heating devices in a manner which is known per se and therefore does not need to be discussed in any detail.

It can be seen in the three induction heating devices 11 in the left-hand region that, in contrast to FIG. 2, they are somewhat offset in relation to one another or are moved apart from one another. This means that the short side 20 of the central induction heating device 11 runs clearly to the right of the straight line through the two long short sides 19 of the upper and of the lower induction heating device 11. This offset provides options, which will be explained in greater detail later with reference to FIG. 7, for the arrangement of a plurality of or various pots on said induction heating devices.

By virtue of interconnection (not illustrated in any detail), the controllers 29 can operate the induction heating devices 11 either in each case entirely on their own or else in combination, for example the upper two induction heating devices or the lower two induction heating devices 11 together.

As the power electronics system for an arrangement of this kind of three induction heating devices 11 according to the disclosure next to one another and two induction heating devices 27 separately from them, it is sufficient to provide a quadruple generator and an auxiliary converter which is a converter without its own power supply system filter, in order to operate all the said induction heating devices. In this case, the dimensions of the induction hob 25 correspond to those of a conventional 60 cm hob, that is to say that the induction hob 25 is approximately 60 cm wide and somewhat greater than 50 cm deep.

FIG. 4 shows how two induction heating devices 11 according to FIG. 1 can each be arranged next to one another offset through 180° in relation to one another. In this case, this is done in line with the basic principle of FIG. 2, which means that the long short side 19 of the upper induction heating device 11 and the short side 20 of the lower induction heating device 11 lie approximately in a straight line and the corners 19/18" and 18"/20 of the upper induction heating device 11 are situated relatively close to the corners 20/18" and 18"/19 of the lower induction heating device 11. This produces a relatively compact rectangular total surface area.

Moreover, FIG. 4 also shows how a plurality of ferrites 31 can be arranged along an induction heating device 11 or its induction coil. In this case, one ferrite 31 is arranged over the corners of the induction coil of the induction heating device 11 in each case, one ferrite 31 is arranged centrally over the long short side 19 and three ferrites are arranged along the long sides 18' and 18" in each case. The ferrites 31 over the corners have a length of 56 mm and the others have a length of 45 mm. The width can be 15 mm and the thickness can be 5 mm.

FIG. 5 shows an arrangement of two induction heating devices 11 similarly to FIG. 4 but which are laterally moved apart from one another to a certain extent. In comparison to the arrangement from FIG. 4, the upper induction heating device 11 is moved a few centimeters to the left, so that the corners are no longer situated close together as in FIG. 4. Although large round pots can be heated less effectively and less uniformly in the case of an arrangement of this kind than in the case of an arrangement according to FIG. 4, elongate roasting tins can be heated more effectively in this way, as can small pots, wherein the small pots are each placed over the relatively wide region of the induction heating devices 11. Further information about such options will be provided in the text which follows with reference to FIGS. 6 and 7.

FIG. 6 shows an arrangement of three induction heating devices 11 in line with FIG. 2. Here, the in each case short sides are again situated to the left and right approximately in a straight line. The illustration of two small pot outlines 34 using a solid line shows how individual small pots with a diameter of 145 mm can be heated by means of in each case one of the induction heating devices 11. In this case, the induction coils of the induction heating devices 11 can each be individually actuated as desired.

A large pot outline 35 is shown using a dashed line and represents a large pot with a diameter of 210 mm. Said pot can be heated jointly by the induction coils of the two upper induction heating devices 11, while a small pot can be heated on the lowermost induction heating device 11 separately from the said large pot.

An oval roasting tin outline 37, which represents a roasting tin with a length of approximately 250 mm and a width of approximately 150 mm, is shown using a dash-dotted line. The said roasting tin can be heated in exactly the same way as the large pot by means of the upper two induction heating devices 11 in joint operation. All the induction coils of all three induction heating devices 11 can be operated jointly for even larger roasting tins (not illustrated here).

Figure 7:
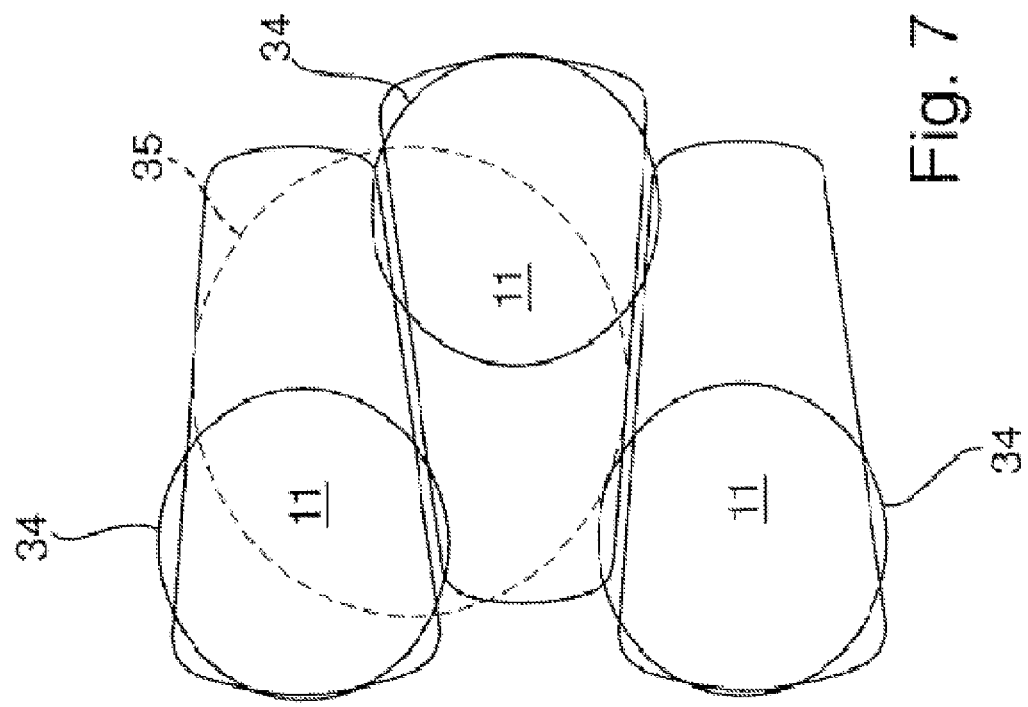
FIGS. 6 and 7 show possible arrangements of three induction coils next to one another.

In the case of the arrangement of FIG. 7 which corresponds, in principle, to FIG. 3, the three induction heating devices 11 are again offset from one another to a great extent. In this case, small pots corresponding to the small pot outlines 34 which are shown using a solid line can be heated more effectively because they are spaced apart from one another to a somewhat greater extent and therefore can be handled more effectively. However, the large pot outline 35 which is shown using a dashed line disadvantageously protrudes at some points. A roasting tin which corresponds to the oval roasting tin outline 37 can again be heated just as effectively or even still somewhat more effectively.

The invention claimed is:

1. An induction heating device comprising:
   at least two induction coils each being one of a flat or a planar design and having at least one peripheral coil turn comprising coil wire,
   wherein one of an outer contour of each of said at least two induction coils or an outermost portion of said at least one peripheral coil turn being approximately trapezoidal in shape having two long sides of equal length which are situated opposite one another, and having two short sides of differing length being situated between said two long sides of equal length and being curved slightly outwards, wherein either length of said two long sides of equal length being greater than either length of said two short sides of differing length,
   wherein said two induction coils being arranged in close alignment with one of the two long sides of equal length of one of the two induction coils in parallel with one of the two long sides of equal length of the other of the two induction coils,
   wherein said two short sides of differing length of said two induction coils are situated opposite one another such that a shorter side of said two short sides of one of said two induction coils being situated proximate a longer side of said two short sides of the other of said two induction coils, and
   wherein said two induction coils are arranged offset with respect to one another being displaced a non-zero distance with respect to a shorter side of said two short sides of one of said two induction coils and the oppositely situated longer side of said two short sides of the other of said two induction coils.

2. The induction heating device of claim 1, wherein said two long sides of equal length being situated opposite one another are straight.

3. The induction heating device of claim 1, wherein said induction coil being configured with an axis of symmetry that runs between said two long sides of said induction coil.

4. The induction heating device of claim 1, wherein said at least one peripheral coil turn has an angular profile in a corner region of said trapezoidal shape.

5. The induction heating device of claim 4, wherein two coil turns of said outermost portion have an angular profile in said corner region of said trapezoidal shape.

6. The induction heating device of claim 4, wherein coil turns situated further inwards from said outermost portion of said at least one peripheral coil turn with said angular profile have a rounded profile.

7. The induction heating device of claim 1, wherein said induction coil is approximately 1.5 times to 2.5 times as long as a longer side of said two short sides.

8. The induction heating device of claim 1, wherein said induction coil, at an end with a longer side of said two short sides, is 1.3 times to 2.5 times as wide as at an end with a shorter side of said two short sides.

9. The induction heating device of claim 1, wherein a central region of said induction coil is free of said coil turns.

10. The induction heating device of claim 9, wherein approximately one third of a surface area of said induction coil is free of said coil turns.

11. An induction hob, comprising:
    two induction coils, each of said two inductions coils being one of a flat or a planar design and having at least one peripheral coil turn comprising coil wire, and
    at least two operator control elements that actuate the respective two induction coils,
    wherein one of an outer contour of each of said two induction coils or an outermost portion of each of said two induction coils turns being approximately trapezoidal in shape having two long sides of equal length which are situated opposite one another, and having two short sides of differing length being situated between said two long sides of equal length and being curved slightly outwards, wherein either length of said two long sides of equal length being greater than either length of said two short sides of differing length,
    wherein said two induction coils being arranged in close alignment where one of the two long sides of equal length of one of the two induction coils being in parallel with one of the two long sides of equal length of the other of the two induction coils,
    wherein said two short sides of differing length of said two induction coils are situated opposite one another such that a shorter side of said two short sides of one of said two induction coils being situated proximate a longer side of said two short sides of the other of said two induction coils, and
    wherein said two induction coils are arranged offset with respect to one another being displaced a non-zero distance with respect to a shorter side of said two short sides of one of said two induction coils and the oppositely situated longer side of said two short sides of the other of said two induction coils.

12. The induction hob of claim 11, wherein said two long sides of equal length being situated opposite one another are straight.

13. The induction hob of claim 11, wherein each said two induction coils being configured with an axis of symmetry between said two long sides of said induction coil.

14. The induction hob of claim 11, wherein said at least one peripheral coil turn has an angular profile in a corner region of said trapezoidal shape.

15. The induction hob of claim 14, wherein two coil turns of said outermost portion have an angular profile in said corner region of said trapezoidal shape.

16. The induction hob of claim 14, wherein coil turns situated further inwards from said outermost portion of said two induction coil turns with said angular profile have a rounded profile.

17. The induction hob of claim 11, wherein each of said two induction coils is approximately 1.5 times to 2.5 times as long as a longer side of said two short sides.

18. The induction hob of claim 11, wherein each said two induction coils, at an end with a longer side of said two short sides, is 1.3 times to 2.5 times as wide as at an end with a shorter side of said two short sides.

19. The induction hob of claim 11, wherein a central region of each said two induction coils is free of said coil turns.

20. The induction hob of claim 19, wherein approximately one third of a surface area of each of said two induction coils is free of said coil turns.

* * * * *